United States Patent [19]

Loew et al.

[11] 4,251,656
[45] Feb. 17, 1981

[54] CATIONIC DYES

[75] Inventors: Peter Loew, Münchenstein; Rudolf Zink, Therwil; Stefan Koller, Ramlinsburg, all of Switzerland

[73] Assignee: Ciba-Geigy Corporation, Ardsley, N.Y.

[21] Appl. No.: 915,328

[22] Filed: Jun. 13, 1978

[30] Foreign Application Priority Data

Jun. 17, 1977 [LU] Luxembourg .......................... 77571
Sep. 30, 1977 [LU] Luxembourg .......................... 78217

[51] Int. Cl.$^3$ .................... C07D 209/14; C09B 23/16
[52] U.S. Cl. ...................................... 542/417; 542/422
[58] Field of Search ........................ 542/416, 422, 417

[56] References Cited

U.S. PATENT DOCUMENTS

| | | | |
|---|---|---|---|
| 3,345,355 | 10/1967 | Raul et al. .......................... | 542/417 X |
| 3,635,955 | 1/1972 | Hansen et al. ..................... | 542/417 |
| 3,741,982 | 6/1973 | Fujino et al. ...................... | 542/417 X |
| 3,769,279 | 10/1973 | Kuhlthau et al. .................. | 542/417 |
| 3,773,764 | 11/1973 | Lehment ............................. | 542/417 |
| 3,812,107 | 5/1974 | Boehmke et al. .................. | 260/165 |
| 3,973,903 | 8/1976 | Clarke ................................. | 8/92 |
| 4,000,130 | 12/1976 | Brack et al. ....................... | 542/417 X |
| 4,083,680 | 4/1978 | Psaar .................................. | 8/2.54 |
| 4,092,104 | 5/1978 | Clarke ................................. | 8/41 R |

FOREIGN PATENT DOCUMENTS

| | | | |
|---|---|---|---|
| 2139006 | 2/1972 | Fed. Rep. of Germany . | |
| 2452321 | 5/1976 | Fed. Rep. of Germany ........... | 542/417 |
| 2452330 | 5/1976 | Fed. Rep. of Germany ........... | 542/422 |
| 2503098 | 7/1976 | Fed. Rep. of Germany ........... | 542/422 |
| 2502024 | 8/1976 | Fed. Rep. of Germany ........... | 542/417 |

OTHER PUBLICATIONS

LUBS, The Chemistry of Synthetic Dyes and Pigments, A.C.S.; 1955, pp. 670–671.

*Primary Examiner*—Arthur P. Demers
*Attorney, Agent, or Firm*—Michael W. Glynn; Edward McC. Roberts

[57] ABSTRACT

There are described new cationic dyes of the formula $$\left[\underset{\underset{R}{|}}{\underset{N}{A}}\underset{\underset{}{|}}{\overset{R}{\underset{}{\diagdown}}}\underset{CH}{\overset{R}{\diagup}}\overset{X}{=}\underset{\underset{R_1}{|}}{N}\underset{B}{\bigcirc}(O-Z)_{\overline{n}}-OH\right]^{\oplus} T^{\ominus}$$

wherein

R 's independently of one another each represent a straight-chain or branched-chain alkyl group having 1 to 4 carbon atoms, X represents CH or N, $R_1$ represents hydrogen in the case where X=CH, or represents a straight-chain or branched-chain alkyl group having 1 to 6 carbon atoms in the case where X=N, Z represents unsubstituted or substituted alkylene which has 2 to 4 carbon atoms and which can be interrupted by one or more hetero atoms, n represents 0 or 1, and T represents an anion, and the rings A and/or B can optionally contain further substituents, processes for producing these dyes, and their use for dyeing and printing materials dyeable with cationic dyes, for dope dyeing textile materials consisting of homo- or copolymers of acrylonitrile, and for dyeing wet tow, by which means are obtained yellow dyeings having good fastness properties.

17 Claims, No Drawings

CATIONIC DYES

The invention relates to new cationic dyes, to processes for producing them, and to their use for dyeing and printing materials, particularly textile materials, dyeable with cationic dyes.

There have been found new cationic dyes corresponding to the general formula I

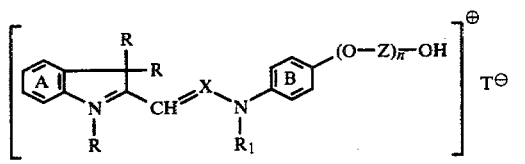

wherein
- R's independently of one another each represent a straight-chain or branched-chain alkyl group having 1 to 4 carbon atoms,
- X represents CH or N,
- $R_1$ represents hydrogen in the case where X=CH, or represents a straight-chain or branched-chain alkyl group having 1 to 6 carbon atoms in the case where X=N,
- Z represents unsubstituted or substituted alkylene which has 2 to 4 carbon atoms and which can be interrupted by one or more hetero atoms,
- n represents 0 or 1, and
- T represents an anion, and the rings
- A and/or B can optionally contain further substituents.

In preferred dyes, n represents the number 1.

As a straight-chain or branched-chain alkyl group having 1 to 4 carbon atoms, R represents for example the methyl, ethyl, n- and isopropyl group or n-, sec- or tert-butyl group. In preferred dyes, R represents a straight-chain alkyl group, in each case particularly the methyl group.

As a straight-chain or branched-chain alkyl group, $R_1$ represents in particular a straight-chain, unsubstituted alkyl group having 1 to 6 carbon atoms, for example the methyl, ethyl, n- and isopropyl group or the n-, sec- or tert-butyl group, and also the straight-chain or branched-chain pentyl or hexyl group; or $R_1$ represents a substituted alkyl group ($C_1$–$C_6$), with substituents being, e.g.: OH, phenyl, COOH, COO-alkyl ester, $CONH_2$, N-mono- or N-dialkylated carboxylic acid amide groups, and halogen such as in particular chlorine. In preferred dyes, $R_1$ represents the $CH_3$ or $C_2H_5$ group in the case where X=N.

As an alkylene group, Z represents for example the ethylene, propylene or butylene group. These group can be interrupted by one or more hetero atoms, such as —O— or —S—. In addition, these alkylene groups can be substituted by, e.g., unsubstituted alkyl groups having 1 to 4 carbon atoms, or $C_1$–$C_4$-alkyl groups which are substituted by, e.g., halogen such as fluorine, chlorine or bromine, or by hydroxyl. If n=1, Z can however form a ring of the formula

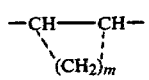

wherein m represents the numbers 3 to 10 inclusive. In preferred dyes, Z represents the $C_2H_4$ group which is either unsubstituted or substituted with $C_1$–$C_4$-alkyl.

As an anion, T represents both organic and inorganic ions, e.g. the halide ion, such as the chloride, bromide or iodide ion, also the sulphte, methylsulphate, aminosulphonate, perchlorate, carbonate, bicarbonate, phosphate, phosphomolybdic, phosphotungstic, phosphotungstomolybdic, benzenesulphonate, 4-chlorobenzenesulphonate, naphthalenesulphonate, oxalate, maleinate, acetate, propionate, lactate, succinate, chloroacetate, tartrate, methanesulphonate, benzoate and rhodanide ions, or complex anions, such as that of chlorine-zinc double salts.

If the rings A and/or B are further substituted, the substituents are, for example: halogen such as fluorine, chlorine or bromine, the $NO_2$ group, alkyl groups and alkoxy groups having 1 to 4 carbon atoms, such as the methyl, ethyl, methoxy, ethoxy, hydroxyethoxy, propoxy or butoxy group.

In preferred dyes, the rings A and B are not further substituted, or the ring A alone is further substitued by halogen, nitro, a straight-chain or branched-chain alkyl group or an alkoxy group having in each case 1 to 4 carbon atoms; or the ring A is substituted as stated, and the ring B is further substituted by halogen, or by a straight-chain or branched-chain alkyl group having 1 to 4 carbon atoms, particularly by the $CH_3$ group. Interesting dyes are also those in which the ring A is substituted by chlorine in the p-position with respect to the N bond, and the ring B is not further substituted.

Particularly interesting cationic dyes according to the invention correspond to the formula Ia

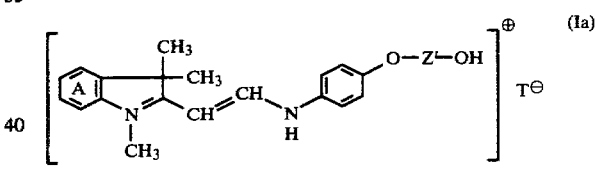

wherein
- T has the meaning given,
- Z' represents the $C_2H_4$ group which is unsubstituted or substituted with $C_1$–$C_4$-alkyl, and the
- ring A is either unsubstituted or is substituted by halogen, especially chlorine, in particular in the p-position with respect to the N bond;

or to the formula Ib

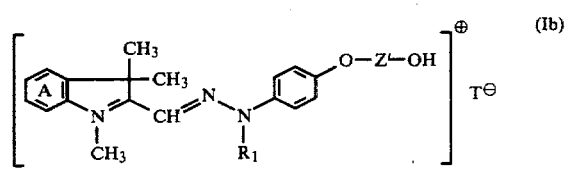

wherein
- T has the meaning given,
- Z' represents the $C_2H_4$ group which is unsubstituted or is substituted with $C_1$–$C_4$-alkyl, and the
- ring A is either unsubstituted, or is substituted by halogen, especially chlorine, in particular in the p-position with respect to the N bond, and
- $R_1$ represents the $CH_3$ group or $C_2H_5$ group;

or to the formula Ic

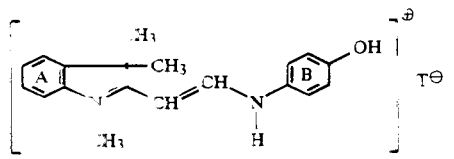

wherein A, T and B have the meanings given under the formula I, and wherein the substituent in A is in the p-position with respect to the N bond;
or to the formula Id

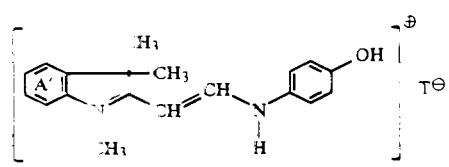

wherein T has the meaning given under the formula I, and A' can be further substituted by chlorine in the p-position with respect to the N bond;
or to the formula Ie

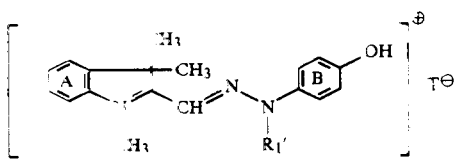

wherein T, A and B have the meanings given under the formula I, and $R_1'$ represents the $CH_3$ group or $C_2H_5$ group, and wherein the substituent in A is in the p-position with respect to the N bond;
and finally to the formula If

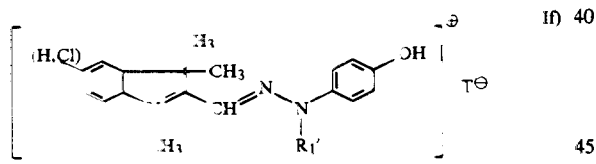

wherein T has the meaning given under the formula I, and $R_1'$ represents the $CH_3$ group or $C_2H_5$ group.

The new dyes of the formula I according to the invention wherein X represents the CH group are greenish-yellow to yellow dyes, and wherein X represents the N group they are golden yellow dyes, which can be combined very readily, in spite of the phenolic OH group (n=0), with other cationic dyes not having such a group; they have a very good pH-stability and very good solubility in water, thus rendering possible dyeing from short liquors, and they are moreover resistant to bath additives, such as inorganic salts; in particular they are not affected by rhodanide.

The new cationic dyes of the formula I are used for dyeing and, with the addition of binders and other customary additives, for printing materials, particularly textile materials, which are dyeable with cationic dyes, and which advantageously consist for example of homo- or copolymers of acrylonitrile, or synthetic polyamides or polyesters which are modified by acid groups. Furthermore, the new cationic dyes can also be used for dyeing in particular wet tow, and also plastics materials, leather and paper. Dyeing is preferably performed from aqueous, neutral or acid medium by the exhaust process, optionally under pressure, or by the continuous process. The textile material can be in the widest variety of forms, for example in the form of fibres, filaments, fabrics, knitwear, piece goods and finished articles, such as shirts or pullovers.

The cationic dyes according to the invention can also be added to spinning solutions for producing fibres containing polyacrylonitrile, or can be applied to the undrawn fibres. Finally, the new dyes, particularly those of the formula I wherein X represents the CH group, can be used in the transfer-printing process.

There can be produced by application of the dyes according to the invention very deep, level, greenish-yellow to golden-yellow dyeings and printings which are characterised by very good general fastness properties, such as very good fastness to light, decatising, washing and perspiration.

Those dyes of the formula I which have good solubility in organic solvents, such as perchloroethylene, are also suitable for dyeing the textile materials mentioned, or for dyeing, e.g., plastics materials, from organic media.

The new cationic dyes of the formula I can be produced by various methods, depending on the meaning of the symbol X.

Dyes of the formula I wherein X represents the CH group are obtained, for example, by condensing an aldehyde of the formula II

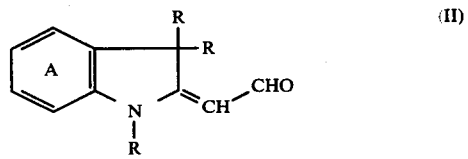

with an amine of the formula III

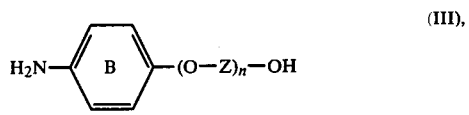

in the presence of an acid HT, wherein the symbols A, B, R, Z, n and T have the meanings given.

Dyes of the formula I wherein X represents the N atom are obtained, for example, by diazotising an amine of the formula III; and coupling the resulting product with a compound of the formula IV

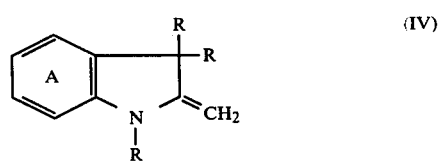

to give a compound of the formula V

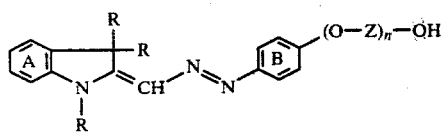

wherein the symbols A, B, R, n and Z have the meanings given; and subsequently alkylating the coupling product with an alkylating agent introducing the radical $R_1$.

The starting compounds of the formulae II, III and IV are known. With respect to compounds of the formula II, these can be for example the following:

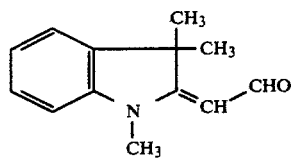

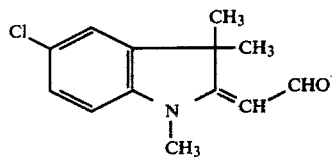

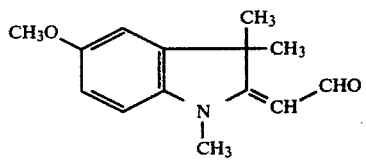

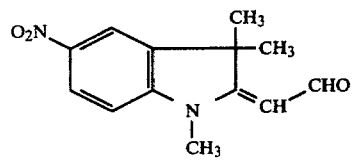

The following are given as examples of compounds of the formula III:

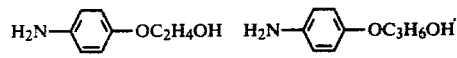

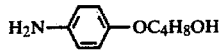

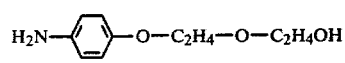

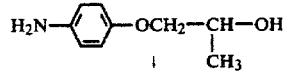

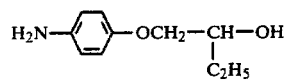

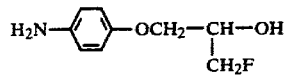

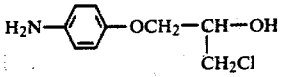

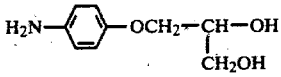

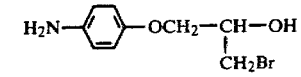

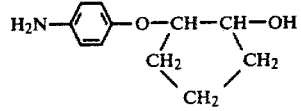

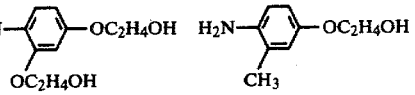

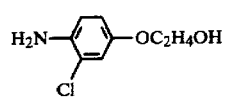

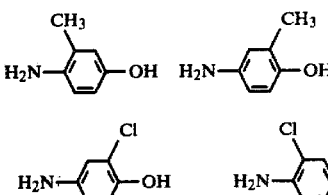

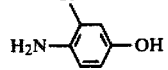

Compounds of the formula IV are for example the following:

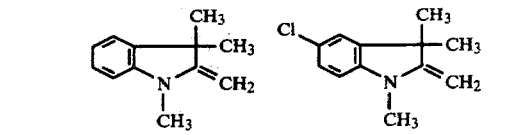

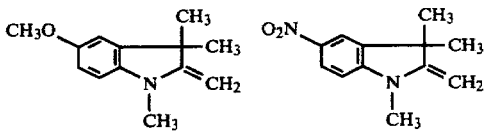

The condensation reaction of the aldehyde of the formula II with the amine of the formula III is performed in a known manner, e.g. in aqueous medium at a temperature of about 0° to 100° C., in the presence of an acid HT. This acid is an organic acid, such as acetic acid or arylsulphonic acid, particularly benzenesulphonic acid, or it is an inorganic acid, such as hydrochloric acid, sulphuric acid or phosphoric acid.

The coupling reaction of the diazotised amine of the formula III with the compound of the formula IV is likewise performed in a known manner, e.g. in aqueous medium at a pH value of about 1 to 9, and at a temperature of 0° to 30° C. The formed coupling product of the formula V is then alkylated.

The alkylation stage can be performed, e.g., in an inert solvent, such as chlorobenzene, or optionally in aqueous suspension, or without solvent in an excess of the alkylating agent, at a temperature of about 20° to 120° C. Suitable alkylating agents are, e.g., alkyl halides such as methyl chloride or ethyl chloride, methyl bromide, ethyl bromide or butyl bromide, methyl iodide or ethyl iodide, alkyl sulphates such as dimethyl sulphate, diethyl sulphate and dibutyl sulphate, benzyl chloride, chloroacetic acid amide, acrylic acid ester, epoxides such as ethylene oxide, epichlorohydrin and, in particular, alkyl esters of aromatic sulphonic acids such as methyl-p-toluenesulphonate and methylbenzenesulphonate, and also the propyl and butyl esters of benzenesulphonic acid.

After condensation or alkylation, the new dyes of the formula I are separated from the reaction medium and dried. If required or if necessary, it is possible in the dyes of the formula I to exchange the anion T for another anion.

In the following Examples, the term 'parts' denotes parts by weight, percentages are percent by weight, and temperatures are given in degrees Centigrade.

EXAMPLE 1

6 parts of 1,3,3-trimethyl-2-methyleneindoline-ω-aldehyde are dissolved in 25 parts of toluene. There are then added 4.6 parts of 4-(2-hydroxy-ethoxy)-aniline and, at 25° to 30° in the course of 5 minutes, 2 parts of glacial acetic acid. The reaction has ceased after 30 minutes' stirring at 25°. To the reaction mixture are then added 100 parts of 1 N hydrochloric acid and 10 parts of toluene; and the two liquid phases are separated. To the aqueous phase are added 10 parts of 10 N hydrochloric acid and 20 parts of sodium chloride, whereupon the yellow cationic dye of the formula

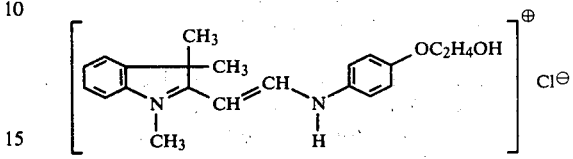

precipitates in crystalline form. The dyeings obtained therewith on polyacrylonitrile have good fastness to light and to washing.

Cationic dyes giving on polyacrylonitrile fibres greenish-yellow shades are obtained by using, instead of 6 parts of 1,3,3-trimethyl-2-methyleneindoline-ω-aldehyde, equimolar amounts of the aldehydes of the formula II which are listed in the following Table I, column II, and instead of 4.6 parts of 4-(2-hydroxy-ethoxy)-aniline, equimolar amounts of the amines of the formula III which are given in column III, with the procedure employed being otherwise as described in Example 1.

TABLE I

| Ex. | II Aldehyde of the formula II | III Amine of the formula III |
|---|---|---|
| | 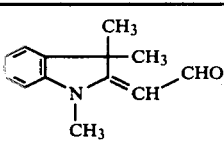 | 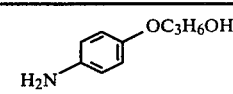 |
| " | | 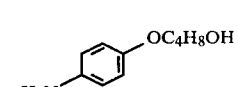 |
| " | | 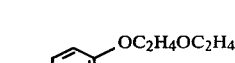 |
| " | | 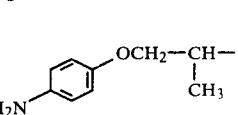 |
| " | | 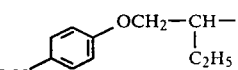 |
| " | | 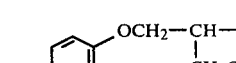 |
| " | | 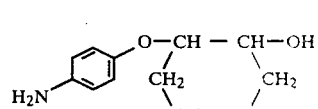 |

TABLE I-continued

| I Ex. | II Aldehyde of the formula II | III Amine of the formula III |
|---|---|---|
| 9 | 5-Cl, 1,3,3-trimethyl-2-(formylmethylene)indoline (CHO-CH=) | 4-(2-hydroxyethoxy)aniline (H₂N-C₆H₄-OC₂H₄OH) |
| 10 | 5-CH₃O, 1,3,3-trimethyl-2-(formylmethylene)indoline | " |
| 11 | 1,3,3-trimethyl-2-(formylmethylene)indoline | 4-(2-hydroxyethoxy)-2-methylaniline |

EXAMPLE 12

15.3 parts of 4-(2-hydroxy-ethoxy)-aniline are dissolved in 100 parts of water with 30 parts of 10 N hydrochloric acid, and to the solution are added dropwise at 0° to 5°, within 15 minutes, 25 parts of 4 N sodium nitrite. The mixture is then diazotised for 30 minutes; there are subsequently added 17.3 parts of 1,3,3-trimethyl-2-methyleneindoline, and the pH value is adjusted to about 4 to 5 by adding dropwise, within 3 hours, 13 parts of 10 N sodium hydroxide solution. The coupling is complete after 10 hours at 25°. The dye which has precipitated is filtered off and dried. To the 33 parts of dye thus obtained are added, in 500 parts of chlorobenzene at 100°, 5 parts of magnesium oxide and 20 parts of dimethylsulphate. The quaternisation reaction has finished after 3 hours at 115°, and the cationic dye of the formula

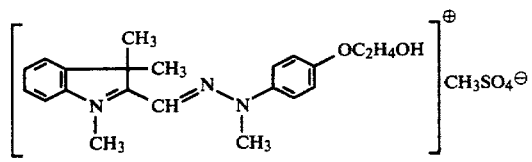

is filtered off at 25° and dried. It is in the form of a golden yellow powder which gives, on polyacrylonitrile, dyeings having good fastness to light and to decatising.

Cationic dyes giving golden yellow shades on polyacrylonitrile fibres are obtained by using, instead of 15.3 parts of 4-(2-hydroxy-ethoxy)-aniline, equimolar amounts of the amines of the formula III which are listed in column III of the following Table II and, instead of 17.3 parts of 1,3,3-trimethyl-2-methyleneindoline, equimolar amounts of the compounds of the formula IV given in column II, and quaternising these coupling products with the quaternising agents shown in column IV, the procedure being otherwise as described in Example 12.

TABLE II

| I Ex. | II Compound of the formula IV | III Amine of the formula III | IV Quaternising agent |
|---|---|---|---|
| 13 | 1,3,3-trimethyl-2-methyleneindoline | 4-(3-hydroxypropoxy)aniline (H₂N-C₆H₄-OC₃H₆OH) | (CH₃)₂SO₄ |
| 14 | " | 4-(4-hydroxybutoxy)aniline (H₂N-C₆H₄-OC₄H₈OH) | " |
| 15 | " | H₂N-C₆H₄-OC₂H₄OC₂H₄OH | " |
| 16 | " | H₂N-C₆H₄-OCH₂-CH(CH₃)-OH | " |

TABLE II-continued

| Ex. | Compound of the formula IV | III Amine of the formula III | IV Quaternising agent |
|---|---|---|---|
| 7 | | ![structure: H₂N–C₆H₄–OCH₂–CH–OH with C₂H₅] | " |
| 8 | | ![structure: H₂N–C₆H₄–OCH₂–CH–OH with CH₂Cl] | " |
| 9 | | ![structure: H₂N–C₆H₄–OC₂H₄OH] | " |
| 20 | ![structure with CH₃, CH₂, CH₃] | | " |
| 21 | ![CH₃O– structure with CH₃, CH₃, CH₂] | | " |
| 22 | ![structure with CH₃, CH₂, CH₃] | ![H₂N–C₆H₄–OC₂H₄OH with CH₃] | " |
| 23 | | ![H₂N–C₆H₄–OC₂H₄OH] | (C₂H₅)₂SO₄ |
| 24 | | | ![ethylene oxide: CH₂–O–CH₂] |

EXAMPLE 25

A polyacrylonitrile copolymer consisting of 93% of acrylonitrile and 7% of vinyl acetate is dissolved in dimethyl acetamide to give a 15% solution. The spinning solution is then extruded into a spinning bath which consists of 40% of dimethyl acetamide and 60% of water. The resulting tow is subsequently drawn by known methods, and freed from dimethyl acetamide by rinsing with hot and cold water.

This wet tow is dyed by immersion in an aqueous bath at 42° of the following composition:

9 g of dye according to Example 1 per liter,
pH-value 4.5 with acetic acid.

The contact time tow/dye liquor is 2 seconds. The excess dye liquor is subsequently squeezed out, and the tow is fed into the dryer. There is obtained in this manner a tow dyed in a yellow shade with good fastness properties.

EXAMPLE 26

5 parts of the dye produced according to Example 12 is stirred with 2 parts of 40% acetic acid into a paste, and this is taken into solution by the addition of 4000 parts of hot water. There are added 1 part of sodium acetate and 2 parts of an addition product which consists of 15 to 20 equivalents of ethylene oxide with N-octadecyldiethylenetriamine and which is quaternised with dimethyl sulphate; and 100 parts of polyacrylonitrile fabric are then introduced at 60°. The bath is heated within 30 minutes to 100°, and the material is dyed at boiling temperature for 90 minutes. The liquor is subsequently cooled in the course of 30 minutes to 60°, and the material dyed in this manner is taken out, and afterwards rinsed with lukewarm water and with cold water. The result is a pure yellow polyacrylonitrile dyeing which is fast to light and to decatising.

EXAMPLE 27

6 parts of 1,3,3,-trimethyl-2-methyleneindoline-ω-aldehyde are dissolved in 25 parts of toluene. To the solution are added 3.5 parts of p-aminophenol and, at 25°–30° in the course of 5 minutes, 2 parts of glacial acetic acid. Stirring is maintained for 30 minutes at room temperature, and 100 ml of water and 30 ml of concentrated hydrochloric acid are then added. The precipitate is filtered off, washed with a small amount of water and dried to thus yield 6 parts of the dye of the formula

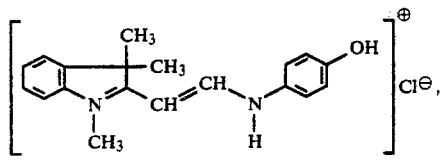

which dyes polyacrylonitrile in a greenish-yellow shade having good fastness properties.

Cationic dyes which dye polyacrylonitrile likewise in a greenish-yellow shade are obtained by using, in place of 6 parts of 1,3,3-trimethyl-2-methyleneindoline-ω-aldehyde, equimolar amounts of the aldehydes of the formula II which are listed in column II of the following Table III and, in place of 3,5 parts of p-aminophenol, equimolar amounts of the amines of the formula III which are shown in column III, the procedure being otherwise as described in Example 27.

TABLE III

| I Ex. | II Aldehyde of the formula II | III Amine of the formula III |
|---|---|---|
| 28 | [CH₃, CH₃ indoline with CHO, N-CH₃] | H₃C-C₆H₃(NH₂)(OH) |
| 29 | " | CH₃-C₆H₃(NH₂)(OH) |
| 30 | " | Cl-C₆H₃(NH₂)(OH) |
| 31 | " | Cl-C₆H₃(NH₂)(OH) |
| 32 | Cl-[CH₃, CH₃ indoline with CHO, N-CH₃] | H₂N-C₆H₄-OH |
| 33 | CH₃O-[CH₃, CH₃ indoline with CHO, N-CH₃] | " |

TABLE III-continued

| I Ex. | II Aldehyde of the formula II | III Amine of the formula III |
|---|---|---|
| 34 | O₂N-[CH₃, CH₃ indoline with CHO, N-CH₃] | " |

EXAMPLE 35

10.9 parts of p-aminophenol are dissolved in 100 parts of water and 20 parts of concentrated hydrochloric acid, and at 0°-5° are added dropwise, within 30 minutes, 25 parts of 4 N sodium nitrite solution. The mixture is diazotised for 30 minutes; an addition of 17.3 parts of 1,3,3-trimethyl-2-methyleneindoline is then made, and the pH value is adjusted to about 4 to 5 by the dropwise addition within 3 hours of 13 parts of 10 N sodium hydroxide solution. The coupling reaction is complete after 10 hours at 25°. The dye which has precipitated is filtered off and dried. To the 27 parts of dye obtained, in 400 parts of chlorobenzene at 100°, are added 6 parts of magnesium oxide and 20 parts of dimethyl sulphate. The quaternising reaction is finished after 5 hours at 100°. The precipitated dye of the formula

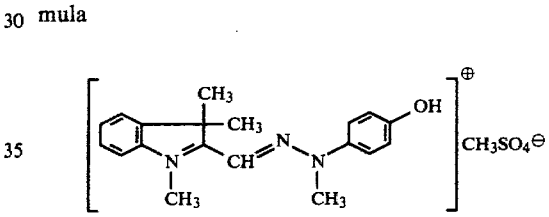

is filtered off at 25°, washed with chlorobenzene and dried. It dyes polyacrylonitrile in golden yellow shades which have good fastness properties.

If the procedure is carried out by steps analogous to those described above except that equimolar amounts of the amines of the formula III which are listed in column III of Table IV are used in place of the 10.9 parts of p-aminophenol, and equimolar amounts of the compounds of the formula IV given in column II in place of the 17.3 parts of 1,3,3-trimethyl-2-methyleneindoline, and finally equimolar amounts of the quaternising agents shown in column IV in place of the 20 parts of dimethyl sulphate, there are obtained cationic dyes which dye polyacrylonitrile in golden yellow shades.

TABLE IV

| I Ex. | II Compound of the formula IV | III Amine of the formula III | IV Quaternising agent |
|---|---|---|---|
| 36 | [CH₃, CH₃ indoline with =CH₂, N-CH₃] | H₂C-C₆H₃(NH₂)(OH) | (CH₃)₂SO₄ |
| 37 | " | CH₃-C₆H₃(NH₂)(OH) | " |

TABLE IV-continued

| Ex. | Compound of the formula IV | Amine of the formula III | Quaternising agent |
|---|---|---|---|
| 38 | | $H_2N$—⟨aryl-Cl⟩—OH | |
| 39 | | $H_2N$—⟨aryl-Cl⟩—OH | |
| 40 | [structure with $CH_3$, $CH_3$, $CH_2$] | $H_2N$—⟨aryl⟩—OH | |
| 41 | | $H_2N$—⟨aryl-CH_3⟩—OH | |
| 42 | $CH_3O$—[structure with $CH_3$, $CH_3$, $CH_2$] | $H_2N$—⟨aryl⟩—OH | |
| 43 | $N$—[structure with $CH_3$, $CH_2$] | | |
| 44 | [structure with $CH_3$, $CH_2$] | | $(C_2H_5)_2SO_4$ |
| 45 | | —N—⟨aryl⟩—OH | |
| 46 | | $N$—⟨aryl⟩—OH | $C_3H_7O-SO_2-\langle\text{Ph}\rangle$ |
| 47 | | | $C_4H_9O-SO_2-\langle\text{Ph}\rangle$ |
| 48 | | | $(C_4H_9)_2SO_4$ |
| 49 | [structure with $CH_3$, $CH_3$, $CH_2$] | | $(C_2H_5)_2SO_4$ |
| 50 | | | $C_4H_9Br$ |

EXAMPLE 51

5 parts of the dye produced according to Example 27 are stirred with 2 parts of 40% aqueous acetic acid into a paste, and this is taken into solution by the addition of 4000 parts of hot water. There are subsequently added 1 part of sodium acetate and 2 parts of an addition product of 15 to 20 equivalents of ethylene oxide with N-octadecyldiethylenetriamine, which product has been quaternised with dimethyl sulphate; and 100 parts of polyacrylonitrile fabric are then introduced at 60°. The bath is heated in the course of 30° minutes to 100°, and the material is dyed at boiling temperature for 90 minutes. The liquor is afterwards allowed to cool during 30 minutes to 60°; and the dyed material is removed and finally rinsed with lukewarm water and with cold water.

A pure greenish-yellow polyacrylonitrile dyeing having fastness to light and to decatising is obtained.

What is claimed is:

1. A cationic dye of the formula

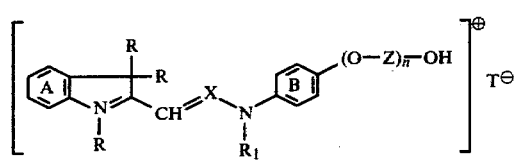

wherein
R independently of one another is straight or branched chain alkyl of 1 to 4 carbon atoms,
X is CH or N,
$R_1$ is hydrogen where X is CH; or is straight or branched chain alkyl of 1 to 6 carbon atoms where X is N,
Z is $C_2H_4$ which is unsubstituted or substituted by $C_1-C_4$ alkyl,
n is 0 or 1,
T is an anion,
the ring A is further unsubstituted or substituted by halogen, nitro, straight or branched chain alkyl of 1 to 4 carbon atoms, or straight or branched chain alkoxy of 1 to 4 carbon atoms; and the ring B is further unsubstituted or substituted by halogen or straight or branched chain alkyl of 1 to 4 carbon atoms.

2. A cationic dye according to claim 1, wherein n is 1.

3. A cationic dye according to claim 1, wherein R is straight chain alkyl.

4. A cationic dye according to claim 3, wherein R is methyl.

5. A cationic dye according to claim 1, wherein the rings A and B are not further substituted.

6. A cationic dye according to claim 1, wherein the ring A is further substituted by halo, nitro, straight or branched chain alkyl of 1 to 4 carbon atoms or straight or branched chain alkoxy of 1 to 4 carbon atoms.

7. A cationic dye according to claim 1, wherein the ring B is further substituted by halo or by methyl.

8. A cationic dye according to claim 1, wherein the ring A is substituted by chloro in the p-position with respect to the N bond and the ring B is not further substituted.

9. A cationic dye according to claim 1, wherein $R_1$ is $CH_3$ or $C_2H_5$.

10. A cationic dye according to claim 1, which dye corresponds to the formula Ia

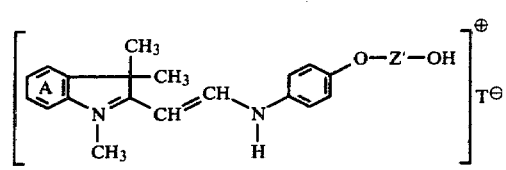

wherein
T has the meaning given,
$Z'$ represents $C_2H_4$ group which is unsubstituted or substituted with $C_1-C_4$-alkyl, and the ring
A is either unsubstituted, or substituted by chlorine, in the p-position with respect to the N bond.

11. A cationic dye according to claim 10, which dye corresponds to the formula

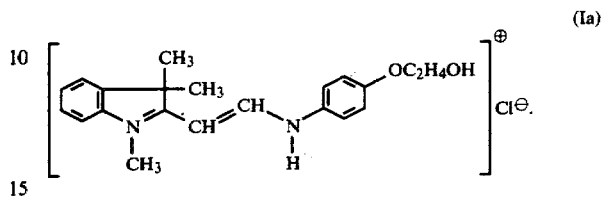

12. A cationic dye according to claim 1, which dye corresponds to the formula Ib

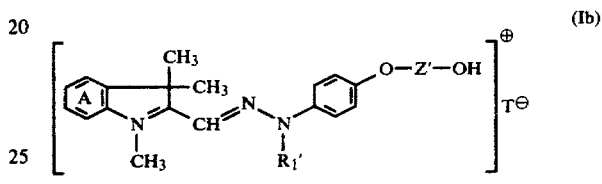

wherein
T has the meaning given,
$Z'$ is $C_2H_4$ group which is unsubstituted or substituted with $C_1-C_4$-alkyl, and ring
A is either unsubstituted, or substituted by chlorine, in the p-position with respect to the N bond, and
$R_1'$ represents the $CH_3$ or $C_2H_5$ group.

13. A cationic dye according to claim 12, which dye corresponds to the formula

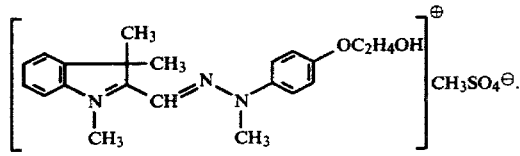

14. A cationic dye according to claim 1, which dye corresponds to the formula Ic

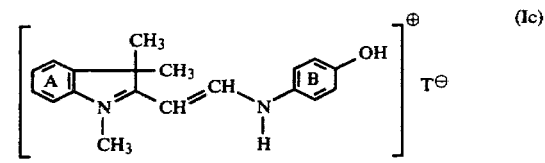

wherein wherein the substituent in A is in the p-position with respect to the N bond.

15. A cationic dye according to claim 14, which dye corresponds to the formula Id

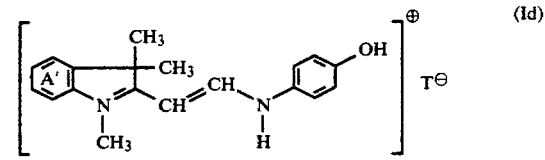

wherein A' is unsubstituted or further substituted by chlorine in the p-position with respect to the N bond.

16. A cationic dye according to claim 1, which dye corresponds to the formula Ie

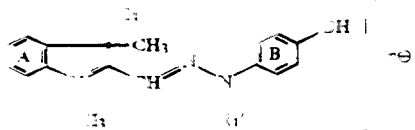

wherein $R_1'$ is $CH_3$ or $C_2H_5$, and wherein the substituent in A is in the p-position with respect to the N bond.

17. A cationic dye according to claim 16, which dye corresponds to the formula If

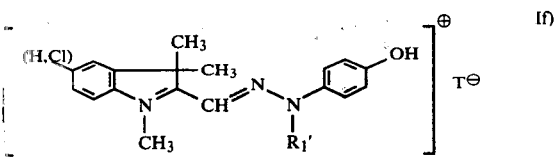

wherein T has the meaning given under the formula I, and $R_1'$ represents the $CH_3$ group or the $C_2H_5$ group.

* * * * *